E. HANUS.
PRESSURE REGULATING DEVICE FOR BALL GRINDING MACHINES.
APPLICATION FILED DEC. 17, 1912.
1,177,699.
Patented Apr. 4, 1916.
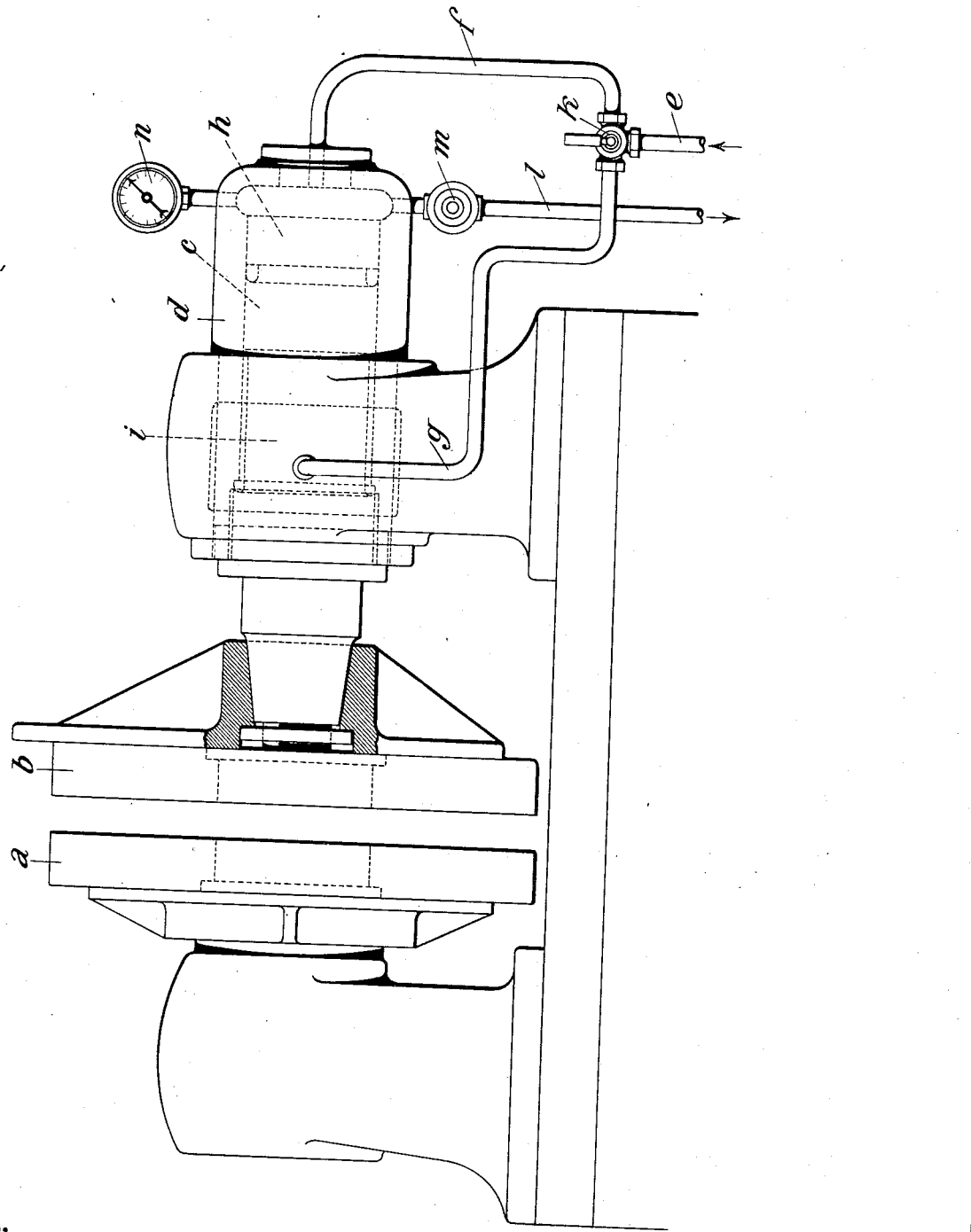

UNITED STATES PATENT OFFICE.

EWALD HANUS, OF TEGEL, NEAR BERLIN, GERMANY.

PRESSURE-REGULATING DEVICE FOR BALL-GRINDING MACHINES.

1,177,699. Specification of Letters Patent. Patented Apr. 4, 1916.

Application filed December 17, 1912. Serial No. 737,260.

*To all whom it may concern:*

Be it known that I, EWALD HANUS, a subject of the King of Prussia, residing at No. 14 Treskowstrasse, Tegel, near Berlin, Germany, have invented certain new and useful Improvements in and Relating to Pressure-Regulating Devices for Ball-Grinding Machines, of which the following is a specification.

The invention relates to a pressure regulating device for ball grinding machines. In the known machines of this kind the grinding plates are pressed one against the other by means of a spring, the tension of which can be regulated by means of a screw device, for example. This arrangement does not afford the possibility of an exact adjustment of the pressure required for the kind of ball being ground for the time being, or its exact control during the grinding, particularly with the high pressures necessary in wet grinding.

The present invention resides in the fact that the fast plate of the pair of plates is mounted on the rod of a piston which is subjected to the action of a pressure medium which is in communication with a pressure meter, so that the grinding plates are exactly adjustable in correspondence with the kind of ball to be ground and can be pressed one against the other with a pressure which is ascertainable at any time. By this means the result is attained that the pressure most suitable for each kind of ball and which can be determined from a table can be exactly adjusted and this pressure can be maintained during the grinding, whereby the grinding operation is largely improved and cheapened. Furthermore, when fresh balls are fed to the machine, the presence of balls of excessive size is at once automatically indicated by the sudden increase of the pressure.

An embodiment of the invention is illustrated by way of example in the accompanying drawing.

Of the two grinding plates the plate $a$ is rotated while the other plate $b$ is fast. This plate $b$ is connected with the rod of a piston $c$ which is guided in the cylinder $d$ and displaced by a pressure medium such as compressed air or water under pressure. The pressure medium is supplied to the machine through a pipe $e$ from which pipes $f$ and $g$ lead into pressure chambers $h$ and $i$ one behind and one in front of the piston $c$. The admission of the pressure medium to these pipes $f$ and $g$ is controlled by a three-way cock $k$. A pipe $l$ comprising a valve $m$ and a pressure meter $n$ is fitted to the pressure chamber located behind the piston $c$ for the purpose of discharging the pressure medium from the machine. When the machine is to be rendered operative, in the first place the pressure appropriate for the kind of ball to be ground is ascertained from the table. Then, with the valve $m$ closed, the cock $k$ is adjusted so that the pressure medium flows from the pipe $e$ through the pipe $f$ into the pressure chamber $h$ behind the piston $c$ and presses it with the grinding plate $b$ attached thereto against the other grinding plate $a$. The pressure meter $n$ indicates the pressure exerted upon the piston $c$ and consequently the pressure with which the plate $b$ is pressed against the plate $a$. By this means the pressure most appropriate to the kind of ball to be ground is obtained exactly. When this has been done, the cock $k$ is adjusted so that the two pipes $f$ and $g$ are cut off from the pipe $e$. The grinding can then be started. During grinding the pressure meter indicates at all times whether the pressure has remained constant or has altered. By means of the cut off valves $k$ and $m$ any difference that may be indicated can at once be compensated. If when fresh balls are supplied to the machine, balls of excessive diameter are supplied by oversight, the pressure meter indicates the fact by a wide oscillation of its index. The balls of excessive size can then at once be removed, so that the risk of breaking such balls and the injury to the grinding plates consequent thereon, is eliminated.

If the machine is to be rendered inoperative, the valve $m$ is opened and the pipe $e$ placed in communication with the pipe $g$. The pressure medium contained in the pressure chamber $h$ then leaves it and pressure medium enters the pressure chamber $i$ through the pipe $e$, so that the piston $c$ is pressed back and the grinding plate $b$ withdrawn from the plate $a$.

What I claim and desire to secure by Letters Patent of the United States is:—

1. In a ball grinding machine comprising coöperating grinding disks adapted to receive the balls between them, fluid operated means for pressing the grinding disks one against the other, and means for exactly adjusting and controlling the pressure of said fluid operated means during grinding.

2. In a ball grinding machine comprising coöperating grinding disks adapted to receive the balls between them, fluid operated means for pressing the grinding disks one against the other, said means having a hydraulic cylinder, the piston of which is operatively connected to one of said grinding disks, and means connected to said cylinder for controlling and adjusting the pressure within same.

In testimony whereof I affix my signature in presence of two witnesses.

EWALD HANUS.

Witnesses:
ROBERT MICHELSKI,
HENRY HASPER.